United States Patent [19]

Hughes, Jr. et al.

[11] 3,783,499

[45] Jan. 8, 1974

[54] SEMICONDUCTOR DEVICE FABRICATION USING MAGNETIC CARRIER

[75] Inventors: Harry Elroy Hughes, Jr.; Meyer Herbert Wachs, both of Reading, Pa.

[73] Assignee: Bell Telephone Laboratories, Incorporated, Murray Hill, N.J.

[22] Filed: Apr. 24, 1972

[21] Appl. No.: 246,852

Related U.S. Application Data

[63] Continuation of Ser. No. 136,127, April 21, 1971, abandoned.

[52] U.S. Cl. ........................ 29/574, 29/590, 156/17

[51] Int. Cl. ........................ B01j 17/00

[58] Field of Search ................ 156/17, 155; 29/574, 29/590, 626; 269/8

[56] References Cited

UNITED STATES PATENTS

| | | | |
|---|---|---|---|
| 3,439,416 | 4/1969 | Yando | 269/8 |
| 3,518,593 | 6/1970 | Hall | 335/285 |
| 3,612,955 | 10/1971 | Butherus | 317/101 A |
| 3,689,336 | 9/1972 | Bunker | 156/155 |

*Primary Examiner*—Roy Lake
*Assistant Examiner*—W. Tupman
*Attorney*—H. W. Lockhart

[57] ABSTRACT

A process is described in which a semiconductor slice containing an array of individual semiconductor devices is temporarily mounted on a magnetic carrier plate initially by adhesive means. Final processing, such as lapping or otherwise thinning the slice, is done and a film of magnetically responsive material is applied to the semiconductor slice. Alternatively such material may be included in the earlier metalization of the semiconductor devices. The slice is then treated to separate it into an array of individual devices and the adhesive is removed. The devices then remain in the original spaced array and orientation for electrical testing and assembly into apparatus. In such form the devices are suitable for transportation.

5 Claims, 6 Drawing Figures

SEMICONDUCTOR DEVICE FABRICATION USING MAGNETIC CARRIER

This application is a continuation of copending application Ser. No. 136,127 filed Apr. 21, 1971 and now abandoned.

This invention relates to semiconductor device fabrication and assembly. More particularly, it relates to the use of magnetic means for temporary mounting of semiconductor device material during processing and transport.

It is related to copending application Ser. No. 69,823, now U.S. Pat. No. 3,692,168.

BACKGROUND OF THE INVENTION

Semiconductor device fabrication requires temporary mounting arrangements, generally for the processing steps from that point at which the devices have been completely formed within the slice, to the point where the individual devices in chip form emerge ready for final encapsulation or incorporation directly into apparatus assemblies. This stage of fabrication may include separation of the slice into individual devices, that is chips, and appropriate testing, bth electrical and mechanical, of the devices. In the past temporary mounting means for the semiconductor slices and consequent device arrays has been provided by a variety of adhesive materials whose use gives rise to problems connected with the application and removal of the adhesive medium, as well as contamination from it.

The use of adhesive materials to retain semiconductor devices temporarily during fabrication has become even less satisfactory with the development of beam lead, sealed junction semiconductor devices. These devices can be mounted directly on circuit substrates without special encapsulation giving rise, however, to new problems for the apparatus assembler. In particular, certain processing steps must be carried out on the individual device after it has been separated from the slice, including electrical and mechanical testing, packaging for shipment, unpackaging at the assembly location, and finally assembly into a circuit board or substrate. Heretofore, this processing was generally accomplished on an encapsulated and electrically leaded semiconductor device which could be readily handled and electrically contacted. Beam lead sealed junction semiconductor devices, in particular, however, present a new approach and set of problems with respect to the above-described processing steps. The apparatus in accordance with this invention solves the problem of suitable temporary mounting during such processing.

SUMMARY OF THE INVENTION

In accordance with this invention temporary mounting for completed semiconductor slices in the device arrays formed therefrom is provided by magnetic carrier plates fo the ferrite material having a closely spaced pattern of magnetic domains coupled with the provision of a pattern of magnetic film within each semiconductor device so that the devices are attached to the carrier plate and held thereon in a particular orientation and relative spacing.

In accordance with this invention semiconductor devices, both in slice form and as subsequently separated, are mounted in ordered arrays so that appropriate equipment has ready access to the device. In particular, the devices are so located that electrical probes using automatic stepping means may conveniently contact the conductive portions of the devices to carry out electrical tests. Moreover, pick-up devices may also have ready access to devices which are held on the carrier in a uniform orientation and spacing.

In another particular aspect of the invention the carrier plate is formed from a ferrite material which is susceptible to a surface magnetization technique. By means of such a technique a closely spaced pattern of magnetic domains, in which a pole spacing of 0.025 inched (25 mils) is typical, may be produced. Close spacings are required to produce the attractive forces necessary for hold-down of semicondutor devices typically having a 0.044 inches (44 mils) square semiconductor chip. In another advantageous aspect, the ferrite material provides a suitable insulative backing as contrasted with magnetic material of a more highly conductive nature which would prohibit such testing in situ by providing a conductive shorting path through the carrier plate.

It is apparent that the use of a magnetic means for the processing steps described above avoids the problems previously encountered with the use of adhesive materials of various kinds for the temporary mounting of arrays of semiconductor devices.

BRIEF DESCRIPTION OF THE DRAWINGS

The invention, its objects and features, will be more clearly understood from the following detailed description taken in conjunction with the drawing in which.

DETAILED DESCRIPTION

An important aspect of this invention is its compatibility with batch processing based on the manipulation of arrays of semiconductor devices. This manipulation by magnetic means begins after the array of semiconductor devices have been separated into individual devices in the form of chips.

Figure 1:
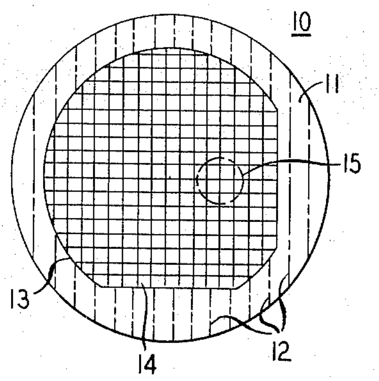
FIG. 1 is a schematic plan view of an assembly comprising a slice of semiconductor material containing an array of devices mounted on a magnetic carrier plate.

In the assembly 10 shown in FIG. 1, the semiconductor slice 13 has been treated so as to form within the slice an array of semiconductor devices which are identical and indicated schematically by the grid of squares 14. The slice 13, in addition to the various diffusion processes required to form semiconductor devices therein, has been subjected to selective metallization processes so as to form the necessary contacts, interconnections and external beam lead connections. Generally, these are formed on the underside of the slice which is in contact with the face of the magnetic carrier plate 11. At this stage, the semiconductor slice 13 is attached to the magnetic carrier plate by means of a suitable adhesive.

Next the mounted slice 13 is subjected to a thinning process to bring it to the desired thickness dimension, typically forming a semiconductor slice with a thickness of about 2 mils. Following the thinning operation the back side of the slice is subjected to a selective deposition of a magnetic material typically of the soft magnetic type, such as Permalloy. Alternatively, the magnetic material may be incorporated in the beam leads as a part of the device metallization process performed earlier in the fabrication process.

The magnetic carrier plate 11 contains a pattern of closely spaced magnetic domains indicated by the broken lines 12 traversing the plate 11. These domains represent alternating north and south magnetic polarity within the carrier plate which typically is of barium ferrite. Other suitable ferrite materials of the permanent magnetic type also may be used. Accordingly, the semiconductor slice 13 now is held on the carrier plate 11 not only by the adhesive, but also by the fields produced by the magnetic domains of the plate 11 linking the magnetic material provided within the semiconductor slice 13.

Figure 2:
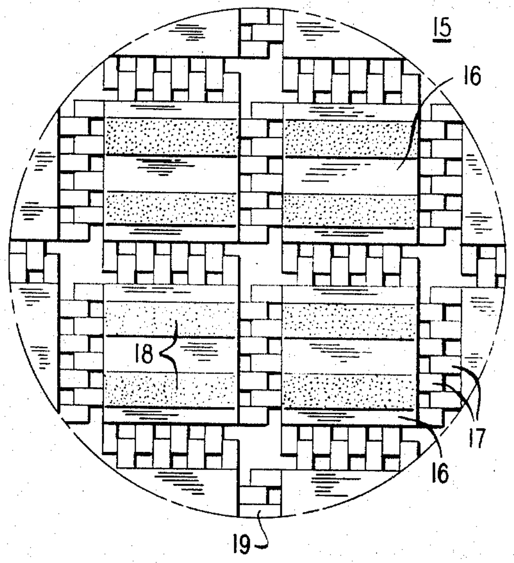
FIG. 2 is an enlarged view of a limited portion of a slice in FIG. 1 after wafer separation showing the semiconductor devices in more detail.

Referring to FIG. 2, which shows a portion of the assembly in enlarged view, the disposition of the magnetic film material is indicated by the shaded areas 18 on the surface of each semiconductor chip 16. The enlarged view of FIG. 2 depicts also the array of beam leads 17 attached to each semiconductor chip 16 and forming the conductive circuit leads therefrom.

In FIG. 1 the semiconductor devices are as yet unseparated and are part of slice 13. To provide the arrangement of individual devices shown in FIG. 2, the slice is suitably masked to cover the back of each individual wafer or chip 16 and the slice is treated with a suitable etchant such as hydrofluoric acid so as to remove the silicon semiconductor material intervening each chip 16 leaving exposed the metal beam leads 17.

In a typical arrangement the semiconductor slice 13 of FIG. 1 may have an outside diameter of about 1½ to 2 inches and the carrier plate of about 1¾ to 2 inches. Each semiconductor chip is about 44 mils square. For these dimensions the magnetic domain or pole spacing within the carrier plate 11 between the boundaries indicated by the broken lines 12 may be about 25 mils. Thus, after the step of etching the devices apart the array of individual devices is retained by the adhesive and by the magnetic forces in the same relative spacing and orientation as existed before separation.

At this point, electrical tests may be performed by applying probe contacts to the exposed beam leads. It is also practicable to remove the adhesive mounting material by treating the assembly to ozone.

Figure 3:
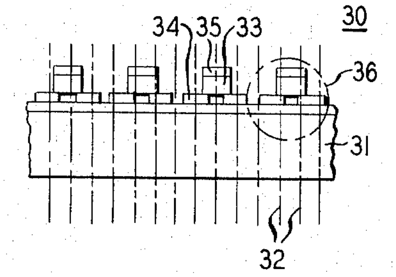
FIG. 3 is a side view of the assembly shown in FIG. 2 showing individual devices mounted on the magnetic carrier plate.

FIG. 3 shows the magnetic film containing devices 33 on the carrier plate 31 with magnetic domain coundaries indicated by broken lines 32. Each semiconductor device 33 includes a magnetic film 35 on the back surface and beam leads 34 on the front surface. This configuration is shown in greater detail with respect to a single device 46 in FIG. 4. It will be seen that the magnetic force of attraction is developed by lines of magnetic force emanating from a pole and returning to the ferrite plate 41, linking through its path the magnetic film 48 on the back surface of the semiconductor chip 46.

A significant aspect of the invention is the material which forms the magnetic carrier plate 41. In accordance with a preferred embodiment, barium ferrite a ceramic material, having a multipole magnetic geometry has been found particularly advantageous. Barium ferrite is a semiconductor which can be magnetized by surface magnetization techniques. In particular, the surface magnetization technique enables extremely close spacing of magnetic domains within the material. These are produced by forming flat coils from sheets of copper or other suitable conductive material by scribing or other mechanical techniques. Such techniques enable fabrication of the thick, closely-spaced conductors required for magnetizing the carrier plate.

By such means, extremely close coil spacings may be achieved using surface magnetization to provide pole spacings within the ferrite plate of the order of 0.025 inch. Such a spacing is advantageous for semiconductor chips of the 44 mil square configuration. Surface magnetization techniques may yield even closer pole spacings within the ferrite carrier plate.

Figure 4:
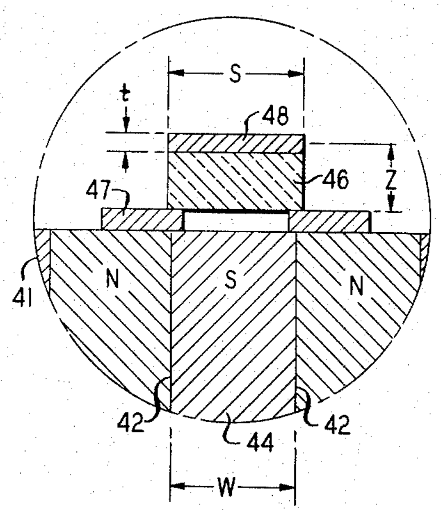
FIG. 4 is an enlarged view of FIG. 3.
Figure 5:
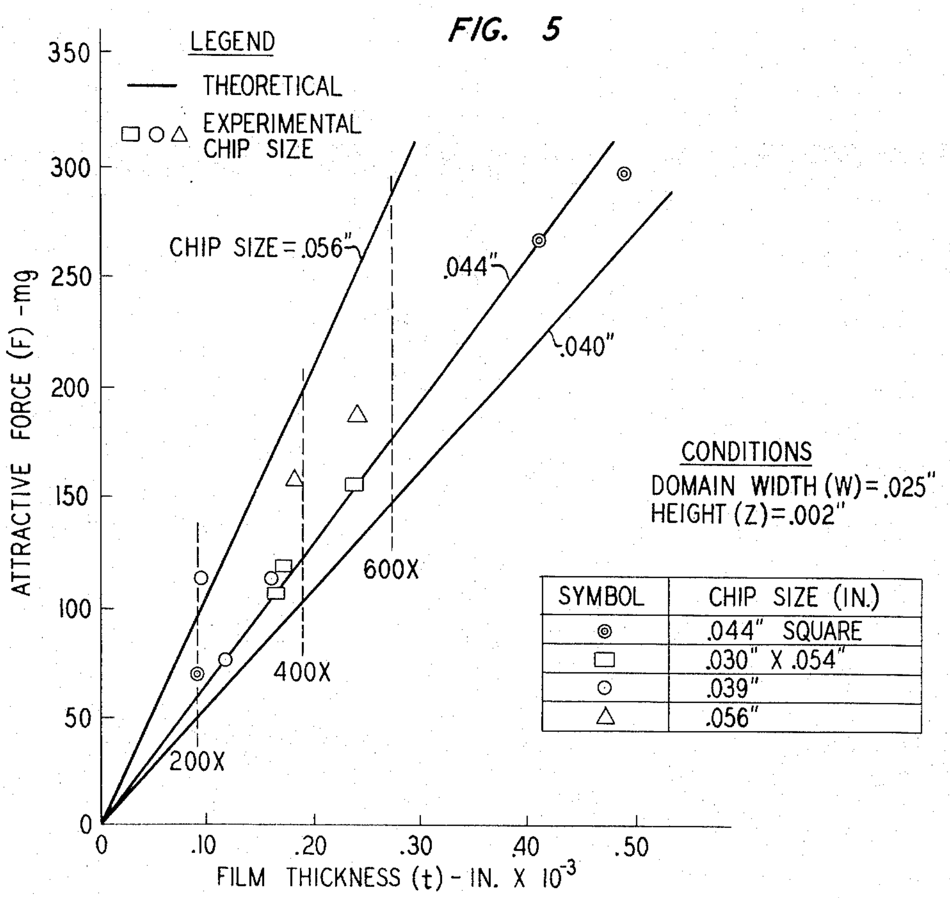
FIG. 5 is a graph relating the attractive force exerted by the magnetic domains of the carrier plate upon semiconductor chips having magnetic films of varying thickness.
Figure 6:
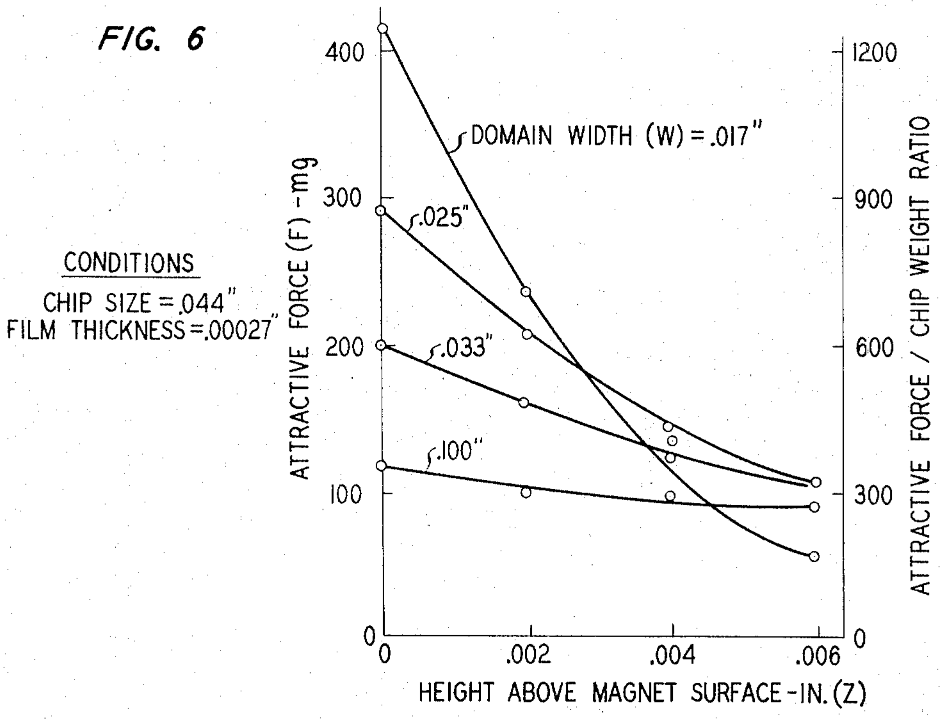
FIG. 6 is a graph showing the variation in attractive force upon chips having the magnetic film disposed at different heights from the magnet surface and for different magnetic domain widths.

The parameters involved in providing the necessary magnetic attractive force in accordance with this invention are illustrated by the curves depicted in the graphs of FIGS. 5 and 6. In connection with these graphs, certain dimensions as shown in FIG. 4 are of particular interest. Within the ferrite carrier plate the domain spacing or pole spacing indicated above as typically 0.025 inch is designated ($w$). This is the distance between the lines 42 of FIG. 4. Another parameter of interest is the area of the magnetic film in the semiconductor device, designated as ($S^2$). Another dimension of concern is the distance between the plane surface of the magnetic carrier plate and the place of the magnetic film in the semiconductor device. This dimension is designated (Z). A further dimension of interest is the magnetic film thickness ($t$).

In the following described specific embodiment the magnetic film material is an iron-nickel-cobalt alloy which is characterized as a soft magnetic material, that is, it has a low value of residual induction. Soft magnetic materials also are desirable for this application inasmuch as they are generally more ductile. Film thicknesses generally are between 0.0002 and 0.0003 inches (0.2 to 0.3 mils). For the several alloys referred to as Permalloy having a relatively high nickel content, film thicknesses in excess of 0.5 mils may result in high thermal stresses within the semiconductor devices if the devices are heated above 300°C. Other soft magnetic materials may provide a closer thermal compatibility.

In the graph of FIG. 4 attractive force in milligrams is the ordinate and film thickness ($t$) in thousands of inches (mils) is the abscissa. Three straight lines depict the theoretical values for chip sizes of 40 mils square, 44 mils square and 56 mils square, as indicated. The pole spacing or domain width ($w$) in the carrier plate was 0.025 inch and the distance (Z) of the magnetic film above the carrier plate surface was 0.002 inch. Points depicted by the identifying shapes indicate actual experimental values observed for various semiconductor chip sizes using a test apparatus to measure actual attractive force developed. From this curve it can be seen that attractive forces in the range of from 100 to several hundred milligrams are readily attained using film thicknesses of from 0.2 to 0.4 mils for the domain spacing and height dimensions given.

Referring to FIG. 6, attractive force and attractive force per chip weight is plotted against the height of the film above the magnetic surface (Z). A series of curves is depicted illustrating the effect of variations in domain width ($w$). The curves indicate that as the domain spacing decreases, the magnetic attractive force is a strong function of the height (Z). In particular, the attractive force for close pole spacing in the carrier plate decreases rapidly as the height above the carrier plate surface increases. Conversely, wider pole spacings produce magnetic fields which more readily link magnetic film members at a greater distance from the carrier plate surface.

In summary, the attractive force between a typical beam lead device, as described above, having a Permalloy film of from 0.2 to 0.3 mil thickness on its back surface and using a barium ferrite carrier plate is from 400 to 600 times the chip weight. This force is entirely adequate to hold devices in position on the carrier plate but at the same time permit removal of individual devices from the plate by means of vacuum pick-ups. Moreover, the use of a barium ferrite carrier plate enables in-place electrical testing of the beam lead device. Such testing is typically carried out by applying probes to the projecting beam leads as the device rests on the carrier plate. Inasmuch as the carrier plate is an insulator, shorting paths do not occur through it.

Althourhg the above embodiment has been described in terms of a barium ferrite carrier plate, other ferrite materials, such as strontium ferrite, may also be used. Likewise, the magnetic film has been described as applied to the back surface of the semiconductor device. However, it may also be included within the beam leads, usually intermediate the multimetal layers of the beam lead.

The magnetic carrier plate described above provides means for holding an array of semiconductor devices with considerable precision for electrical probing in place, individual pick up and removal for other tests and replacement precisely on the carrier, and transport without loss of precision, and finally pick up for bonding to a circuit board. In a typical array of separated 40 mil square chips, movement is held to within three sigma limits, that is, 0.5 mils, and for a 60 mil square chip, 0.3 mils. A typical array expanded for shipment and later assembly may comprise 400 semiconductor devices spaced on 100 mil centers. For shipment of device arrays for considerable distance, as between manufacturing locations, and even by postal means, the resistance of the array to movement may conveniently be increased by laying a thin magnetic sheet about 0.25 mils thick over all of the devices. Such an arrangement has been found to prevent chip movement in shock environments in excess of 500 G.

What is claimed is:

1. In the fabrication and assembly of semi-conductor devices the steps of 1. mounting the semiconductor slice containing an array of individual semiconductor devices on a carrier plate by means of an adhesive, said carrier plate containing an array of permanent magnetic domains in a spaced-apart array corresponding to the array of individual devices in said slice,
2. providing each said semiconductor device with a film of magnetically responsive material,
3. treating said slice to remove material intervening said individual semiconductor device, and
4. removing said adhesive leaving said individual devices mounted on said carrier plate and held solely by magnetic force.

2. The method in accordance with claim 1 in which said film of magnetically responsive material is applied during fabrication of said devices prior to mounting said slice on the carrier plate.

3. The method in accordance with claim 1 in which said film of magnetically responsive material is applied after said slice has been mounted on said carrier plate by application of said film to the back surface of said slice.

4. The method in accordance with claim 1 including the step of removing a layer of material from the back surface of said slice while it is mounted on said carrier plate.

5. The method in accordance with claim 1 which includes the step of electrically testing said individual devices following the step of removing material intervening said individual devices.

* * * * *